US008420021B2

(12) United States Patent
Makita et al.

(10) Patent No.: US 8,420,021 B2
(45) Date of Patent: Apr. 16, 2013

(54) IGNITION OR PLASMA GENERATION APPARATUS

(75) Inventors: Minoru Makita, Kobe (JP); Yuji Ikeda, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 0 days.

(21) Appl. No.: 13/529,578

(22) Filed: Jun. 21, 2012

(65) Prior Publication Data

US 2012/0258016 A1 Oct. 11, 2012

Related U.S. Application Data

(62) Division of application No. 12/668,801, filed as application No. PCT/JP2008/062636 on Jul. 12, 2008, now Pat. No. 8,226,901.

(30) Foreign Application Priority Data

Jul. 12, 2007 (JP) ................................ 2007-183752

(51) Int. Cl.
*B01J 19/08* (2006.01)
*B01J 19/12* (2006.01)
*G01N 27/00* (2006.01)
*F02P 23/00* (2006.01)

(52) U.S. Cl.
USPC ... 422/186.21; 422/54; 422/186; 422/186.04; 422/186.29; 123/143 B

(58) Field of Classification Search ............. 422/186.21, 422/186.29; 123/143 B
See application file for complete search history.

(56) References Cited

U.S. PATENT DOCUMENTS

| | | | |
|---|---|---|---|
| 3,934,566 | A | 1/1976 | Ward |
| 4,138,980 | A | 2/1979 | Ward |
| 6,357,426 | B1 | 3/2002 | Schleupen |
| 7,793,632 | B2 | 9/2010 | Idogawa et al. |
| 2007/0290591 | A1 | 12/2007 | Lykowski et al. |
| 2009/0266325 | A1 | 10/2009 | Kumar et al. |

FOREIGN PATENT DOCUMENTS

| | | | |
|---|---|---|---|
| JP | 51-77719 | A | 7/1976 |
| JP | 6-2658 | A | 1/1994 |
| JP | 2000-230426 | A | 8/2000 |
| JP | 2001-073920 | A | 3/2001 |
| JP | 2004-087498 | A | 3/2004 |
| JP | 2004-169671 | A | 6/2004 |
| JP | 2004-221019 | A | 8/2004 |

OTHER PUBLICATIONS

International Search Report of PCT/JP2008/062636, mailing date of Oct. 14, 2008.

*Primary Examiner* — Jill Warden
*Assistant Examiner* — Charles D Hammond
(74) *Attorney, Agent, or Firm* — Westerman, Hattori, Daniels & Adrian, LLP

(57) ABSTRACT

There is provided an ignition or plasma generation apparatus that eliminates the need for resonance means in a combustion chamber and simplifies the electrode structure within the combustion chamber in an instance where energy from each of a spark discharge and microwaves is used to ignite an air-fuel mixture gas in an internal combustion engine. The ignition or plasma generation apparatus includes a mixing circuit for mixing a high-voltage pulse from a high-voltage pulse generator and microwave energy from a microwave generator; and an ignition plug into which an output from the mixing circuit is supplied, the plug used for introducing the output into a combustion chamber of an internal combustion engine. The output supplied from the mixing circuit to the ignition plug is supplied in a manner in which the microwave energy and the high-voltage pulse are superimposed on each other on a same transmission line.

6 Claims, 20 Drawing Sheets

IGNITION OR PLASMA GENERATION APPARATUS

CROSS-REFERENCE OF RELATED APPLICATIONS

This application is a Divisional of application Ser. No. 12/668,801 filed Jan. 10, 2010, which is a 371 of international Application No. PCT/JP2008/062636, filed Jul. 12, 2008, which claims priority of Japanese Patent Application No. 2007-183752, the entire contents of which are incorporated herein by reference. U.S. patent application Ser. No. 12/668, 801 has been issued as U.S. Pat. No. 8,226,901.

TECHNICAL FIELD

The disclosure relates to an ignition or plasma generation apparatus for performing ignition in an internal combustion engine using a combination of spark discharge and microwave energy.

BACKGROUND OF THE INVENTION

Ignition of an air-fuel mixture gas in an internal combustion engine is normally performed by spark discharge using an ignition plug. However, there have been proposals for a microwave ignition system that uses electromagnetic waves with a frequency of several gigahertz (GHz); i.e., microwaves, for improving combustion efficiency and other purposes.

In order to reliably ignite the air-fuel mixture gas only using microwaves, an extremely strong electrical field is required; therefore, there is a need to put a cavity in a resonant state. As an attempt to resolve this problem, it was proposed in Patent References 1 and 2 for a stub structure for regulating the resonance frequency to be provided in a combustion chamber. It was proposed in Patent Reference 3 for a resonance structure to be provided in the plug in order to obtain a strong electrical field.

Means for combining spark discharge and microwave energy is proposed in patent reference 4. According to a technique described in patent reference 4, an electrode for the spark discharge and an electrode for receiving the microwave energy are each provided separately in a cavity, and are configured so that a strong electrical field is formed in a region of the spark discharge electrode that is physically distant from the electrode for radiating microwaves.

Patent reference 1: JP-A 2000-230426
Patent reference 2: JP-A 2001-73920
Patent reference 3: JP-A 2004-87498
Patent reference 4: JP-A 2000-221019

SUMMARY OF THE INVENTION

In an apparatus for igniting an air-fuel mixture gas in an internal combustion engine using electrical energy, resonance means requiring delicate adjustment is necessary in an instance where the air-fuel mixture gas is ignited using microwave energy alone. Also, in an instance where energy from a spark discharge and microwaves is used to ignite the air-fuel mixture gas, a problem is presented in that an electrode for the spark discharge and an electrode for microwave radiation must both be provided in a combustion chamber, resulting in a complex structure.

An ignition or plasma generation apparatus is provided that eliminates the need for resonance means in a combustion chamber and simplifies the electrode structure within the combustion chamber in an instance where energy from a spark discharge and microwaves is used to ignite an air-fuel mixture gas in an internal combustion engine.

According to a first aspect, an ignition or plasma generation apparatus for using a combination of an electrical discharge and energy derived from electromagnetic waves to initiate a combustion reaction, a chemical reaction, or a plasma reaction in a reaction region where the combustion reaction, the chemical reaction, or the plasma reaction takes place in a heat engine or a plasma equipment; the ignition or plasma generation apparatus comprises a mixer mixing energy for the electrical discharge and energy from electromagnetic waves generated by an electromagnetic wave generator; and a plug into which an output from the mixer is supplied, the plug used for introducing the output to the reaction region; wherein the output supplied from the mixer to the plug includes the energy from electromagnetic waves and the energy for the electrical discharge superimposed on each other and supplied on a same transmission line.

According to the ignition or plasma generation apparatus, a pulse voltage for generating a spark discharge and electromagnetic waves are mixed in a singular transmission line, thereby making it possible to use the same electrode for spark discharge and microwave radiation.

According to a second aspect, the ignition or plasma generation apparatus of the first aspect is preferably configured such that the energy for electrical discharge is a pulse voltage, and the mixer includes: a first input section for receiving an input of the energy from electromagnetic waves; a second input section for receiving an input of the pulse voltage; and an output section connected to the second input section; wherein the first input section is electrically coupled to the output section by an electrical field coupling.

According to a third aspect, the ignition or plasma generation apparatus of the first aspect is preferably configured such that the energy for electrical discharge is a pulse voltage, and the mixer includes: a first input section for receiving an input of the energy from electromagnetic waves; a second input section for receiving an input of the pulse voltage; and an output section connected to the second input section; wherein the first input section is electrically coupled to the output section by a magnetic field coupling.

According to a fourth aspect, the ignition or plasma generation apparatus of the first aspect is preferably configured such that the energy for electrical discharge is a pulse voltage, and the mixer includes: a first input section for receiving an input of the energy from electromagnetic waves; a second input section for receiving an input of the pulse voltage; and an output section connected to the second input section; wherein the first input section is electrically coupled to the output section by a magnetic field coupling and an electrical field coupling connected in series.

According to a fifth aspect, the ignition or plasma generation apparatus of the first through fourth aspects is preferably configured such that the energy for electrical discharge is a pulse voltage, and the pulse voltage input section of the mixer is electrically coupled to the output section by a self-inductance-type inductive element.

According to a sixth aspect, the ignition or plasma generation apparatus of the second or fourth aspect is preferably configured such that the mixer includes a dielectric substrate, the second input section is disposed on one surface of the dielectric substrate, each of the first input section and the output section is disposed on the other surface of the dielectric substrate, and the electrical field coupling derives from the capacitance of a capacitor comprising a conductive pattern disposed in an opposing manner on respective surfaces of the dielectric substrate.

According to a seventh aspect, the ignition or plasma generation apparatus of the sixth aspect is preferably configured such that wherein the width of the conductive pattern constituting the capacitor is equal to or less than one quarter of the wavelength of the electromagnetic wave received by the second input section.

According to an eighth aspect, the ignition or plasma generation apparatus of the sixth aspect is preferably configured such that, wherein the conductive pattern constituting the capacitor is rectangular.

According to a ninth aspect, the ignition or plasma generation apparatus of the sixth aspect is preferably configured such that the conductive pattern constituting the capacitor is substantially circular.

According to a tenth aspect, the ignition or plasma generation apparatus of the second through ninth aspects is preferably configured such that the second input section includes a stub for matching the impedance of the second input section with the characteristic impedance of a transmission line from the electromagnetic wave generator.

According to an eleventh aspect, the ignition or plasma generation apparatus of the second through tenth aspects is preferably configured such that the pulse voltage is inputted via an ignition coil, the mixer is sealed within a metallic conductor case, and a molded plastic material is used to integrate the metallic conductor case and the ignition coil.

According to a twelfth aspect, the ignition or plasma generation apparatus of the first through eleventh aspects is preferably configured such that the plug is a spark plug.

According to a thirteenth aspect, the ignition or plasma generation apparatus of the second through tenth aspects is preferably configured such that the plug is a spark plug, and the mixer is integrated with the spark plug and an antenna.

According to a fourteenth aspect, the ignition or plasma generation apparatus of the second through twelfth aspects is preferably configured such that output supplied from the mixer to the plug includes the energy from electromagnetic waves and the pulse voltage superimposed on each other on the same coaxial cable; and is supplied via an isolator.

According to a fifteenth aspect, the ignition or plasma generation apparatus of the first through eleventh aspects is preferably configured such that the energy from electromagnetic waves is transmitted wirelessly to a mixing circuit.

According to a sixteenth aspect, the ignition or plasma generation apparatus of the first through fifteenth aspects is preferably configured such that energy in a form of at least one of light, sound, shock wave, friction, or heat is supplied on the same transmission line in a superimposed fashion.

According to a seventeenth aspect, the ignition or plasma generation apparatus of the twelfth aspect is preferably configured such that the spark plug includes: a main metal fitting made of a conducting body; a cylindrical insulator that penetrates the main metal fitting; a first center conductor accommodated in the insulator, one end of the first center conductor protruding from one end portion of the insulator; a second center conductor accommodated in the insulator so as to be spaced apart from the first center conductor, one end of the second center conductor protruding from the other end portion of the insulator; a resistance layer provided along an inner wall of the insulator in a space between the first center conductor and the second center conductor; and a dielectric layer formed in a space between the first center conductor and the second center conductor; wherein a capacitor is formed by the first center conductor, the second center conductor, and the dielectric layer, and the resistance layer electrically connects the first center conductor and the second center conductor in parallel to the capacitor.

According to an eighteenth aspect, the ignition or plasma generation apparatus of the twelfth aspect is preferably configured such that the spark plug includes: a main metal fitting made of a conducting body; a cylindrical insulator that penetrates the main metal fitting; and a center conducting section made of a conducting body and accommodated in the insulator, both ends of the center conducting body protruding from the insulator; wherein the characteristic impedance of a coaxial line formed by the main metal fitting, the insulator, and the center conducting section is selected so that the impedance in a direction from the mixer to the reaction region decreases with increasing proximity to the reaction region.

According to a nineteenth aspect, the ignition or plasma generation apparatus of the first aspect is preferably configured such that the plug includes: a center conductor made of a conducting body, one end of which being connected to a center line of the mixer; an antenna-center electrode section made of a conducting body, connected at the other end of the center conductor; an outer conductor made of a conducting body, one end of which being connected to an earthing line of a mixing circuit, the outer conductor provided so as to enclose the center conductor and the antenna-center electrode section and be spaced from the center conductor and the antenna-center electrode section, a hole being provided near the antenna-center electrode section; and a dielectric member inserted into a gap between the center conductor and the outer conductor nearer the mixer than a contact point between the center conductor and the antenna-center electrode section; wherein the insulation distance between the outer conductor and the center electrode, and between the outer conductor and the antenna-center electrode section, is at a minimum near the hole, and the volume of a void defined by the antenna-center electrode section, outer conductor, and the dielectric member is selected so that an increase in pressure in the void when plasma is induced in the void results in a pressure difference between the void and a space that communicates with the void via the hole, the pressure difference being equal to or greater than a predetermined value.

According to a twentieth aspect, the ignition or plasma generation apparatus of the nineteenth aspect is preferably configured to further comprise a path for introducing gas to a void defined by the antenna-center electrode section, outer conductor, and the dielectric member.

According to a twenty-first aspect, the ignition or plasma generation apparatus of the first aspect is preferably configured such that the plug includes a spark plug in which an earthing electrode is either shortened or removed; and a cap made of a conducting body having the shape of a cylinder that opens on both ends, one of the openings being narrowed, and an interior surface near the other opening threadedly engaging with the main metal fitting of the spark plug; wherein the insulation distance between the cap and the center electrode of the spark plug is at a minimum near the narrowed opening, and the volume of a void defined by the spark plug and the cap is selected so that an increase in pressure in the void when plasma is induced in the void results in a pressure difference between the void and a space that communicates with the void via the hole, the pressure difference being equal to or greater than a predetermined value.

According to a twenty-second aspect, the ignition or plasma generation apparatus of the nineteenth aspect is preferably configured to further comprise a path for introducing gas to a void defined by the spark plug and the cap.

According to a twenty-third aspect, the ignition or plasma generation apparatus of the first through twenty-second aspects is preferably configured such that the energy for electrical discharge is an AC voltage energy.

According to a twenty-fourth aspect, the ignition or plasma generation apparatus of the twenty-third aspect of the present invention is preferably configured to further comprise reverse-flow preventer on a path for transmitting the energy for electrical discharge, the reverse-flow preventer being selected according to the frequency of each of the AC voltage and the electromagnetic wave.

According to a twenty-fifth aspect, the ignition or plasma generation apparatus of the first through eleventh aspects is preferably configured such that the plug produces an electrical discharge between the plug and an earthed conducting body that is present in a vicinity of a space in which the plug is installed.

An analysis apparatus for exposing a test sample to a plasma, causing the test sample to enter an excited state, and detecting a result of the excitation; the analysis apparatus comprising: the ignition or plasma generation apparatus according to any of the nineteenth through twenty-second aspects, wherein the ignition or plasma generation apparatus generates the plasma to which the test sample is exposed.

In the ignition or plasma generation apparatus according to the first aspect, output supplied from the mixer to an ignition plug includes microwave energy and a high-voltage pulse superimposed on each other and supplied on a same transmission line, therefore making it possible to use the same electrode for spark discharge and microwave radiation.

Therefore, in the ignition or plasma generation apparatus, a region where the spark discharge occurs and a surrounding region automatically become a region having a strong electrical field created by microwaves, making it possible to for microwaves to generate a plasma using the spark discharge to initiate it.

The ignition or plasma generation apparatus thereby eliminates the need for an ignition plug with a complex structure, a special structure for providing incident microwaves with resonant characteristics in a combustion chamber, or a similar provision; and makes it possible to combine a spark discharge and microwave energy in an engine system with a conventionally-used ignition plug for spark discharge or a conventionally structured combustion chamber, and improve combustion efficiency.

Any of the second through fifth aspects of the mixer in the ignition or plasma generation apparatus make it possible for a first input section to be electrically coupled to an output section by an electric field coupling; the first input section to be electrically coupled to the output section by a magnetic field coupling; the first input section to be electrically coupled to the output section by a magnetic field coupling and an electrical field coupling connected in series; or an input section from the high-voltage pulse generating equipment to be electrically coupled to an output section by a self-inductance type of inductive element.

Any of the sixth through tenth aspects enable the mixer in the ignition or plasma generation apparatus to be constituted by a printed circuit board and readily mass-produced.

The eleventh aspect makes it possible for the mixer in the ignition or plasma generation apparatus to be imparted with a modular structure that is integrated with an ignition coil, both the microwave energy and the high-voltage pulse to be introduced to the combustion chamber and an air-fuel mixture gas in the combustion chamber ignited using a regular ignition plug without having to modify a main body of an internal combustion engine, and for manufacturing to be performed at a cost equivalent to that of assembling a conventional ignition coil.

The thirteenth aspect makes it possible for the mixer in the ignition or plasma generation apparatus to be imparted with a modular structure integrated with an ignition plug and an antenna, and both the microwave energy and the high-voltage pulse to be introduced to the combustion chamber and an air-fuel mixture gas in the combustion chamber ignited using a regular ignition coil without modifying a main body of an internal combustion engine.

Furthermore, the fourteenth aspect of the ignition or plasma generation apparatus enables the microwave energy and high-voltage pulse to be introduced into an interior of the combustion chamber via a coaxial cable and an isolator, resulting in an easier line wiring process, and making it possible to prevent or reduce a flow of a reflection of the microwave energy reversing back to the mixer.

BRIEF DESCRIPTION OF THE DRAWINGS

FIG. 20 depicts a simplified configuration of the analysis apparatus according to the embodiment.

DETAILED DESCRIPTION OF THE INVENTION

First Embodiment

An embodiment of the present invention will now be described with reference to the accompanying drawings.

Figure 1:
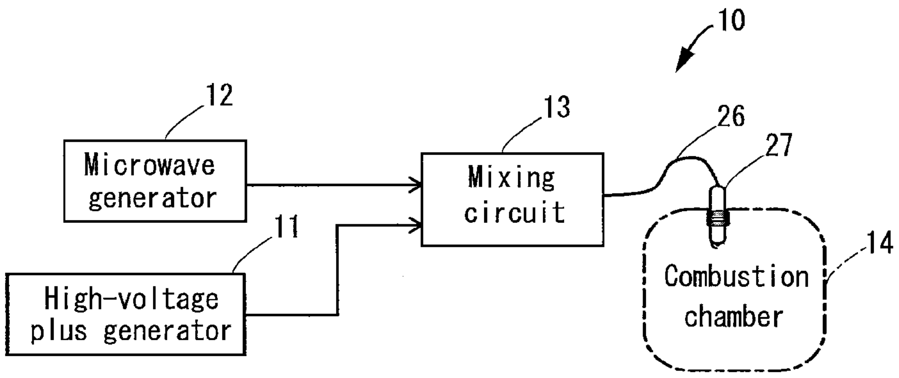
FIG. 1 is a block diagram showing an overall configuration of an ignition or plasma generation apparatus according to the first embodiment of the present invention.

FIG. 1 shows a basic configuration of an ignition or plasma generation apparatus 10 according to a first embodiment of the present invention.

In the ignition or plasma generation apparatus 10, energy generated by each of a high-voltage pulse generator 11 and a microwave generator 12 is transmitted to a mixing circuit 13 that constitutes the mixer, as shown in FIG. 1. The mixing circuit 13 mixes the energy fed from the high-voltage pulse generator 11 and the microwave generator 12. The energy mixed in the mixing circuit 13 is supplied to an ignition plug 27 inserted into a combustion chamber 14 via a mixed output cable 26 that constitutes a transmission channel for the energy.

Figure 2:
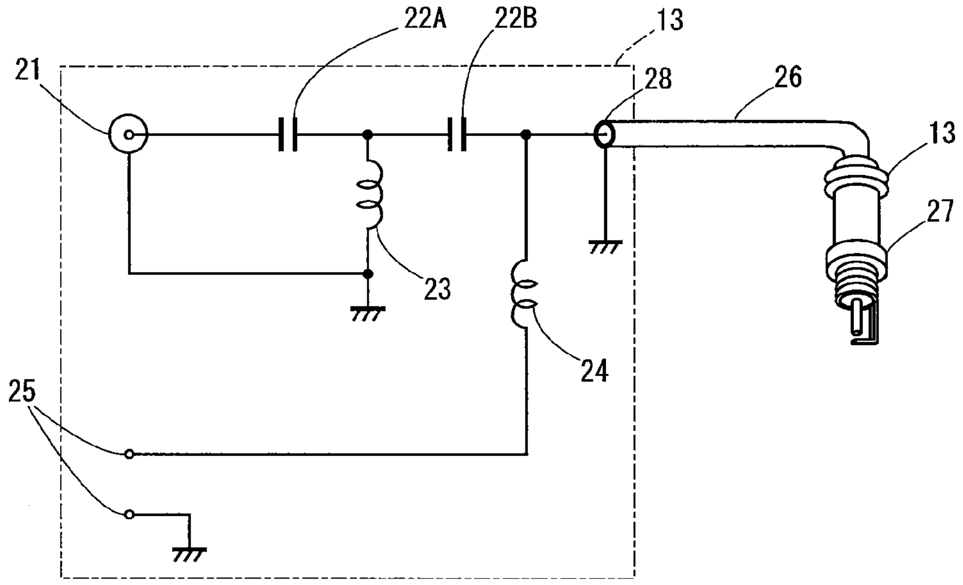
FIG. 2 is a circuit diagram showing a configuration of a mixing circuit in an ignition or plasma generation apparatus according to the first embodiment of the present invention.

FIG. 2 shows a circuit configuration of the mixing circuit 13 in the ignition apparatus.

In the mixing circuit 13, a high-voltage pulse from the high-voltage pulse generator 11 is inputted into a first input terminal 25 as shown in FIG. 2. The first input terminal 25 is connected to an output terminal 28 via a self-inductance coil 24. The output terminal 28 is connected to the mixed output cable 26.

Also, in the mixing circuit 13, microwave energy generated by the microwave generator 12 is inputted into a second input terminal 21. The second input terminal 21 is connected to the output terminal 28 via a capacitor **22*a* and a capacitor 22*b*. One end of a coil 23 for adjusting impedance is connected between the capacitor 22*a* and the capacitor 22*b***, and the other end is earthed.

A capacitor with a small capacity of between several picofarads and several tens of picofarads is selected for the capacitor **22*a* and the capacitor 22*b*. Having such properties means that the capacitor 22*a* and the capacitor 22*b* allow microwaves of several gigahertz (GHz) to pass between the second input terminal 21 and the output terminal 28, while shortwave band frequencies are blocked. For the coil 24, one that has an impedance of several tens of nanohenries to several microhenries is chosen. Having such properties means that microwaves are blocked in the coil 24**, while shortwave band frequencies can travel through.

Therefore, a high-voltage pulse inputted through the first input terminal 25 travels through the coil 24 and is transmitted to the output terminal 28, but does not flow to the second input terminal 21 because of the presence of the capacitors **22*a* and 22*b*. Also, microwaves inputted through the second input terminal 21 travel through the capacitors 22*a* and 22*b* and are transmitted to the output terminal 28, but are blocked from flowing to the first input terminal 25 because of the presence of the coil 24. As a result, the high-voltage pulse inputted through the first input terminal 25 and the microwave inputted through the second input terminal 21 are mixed and outputted through the output terminal 28. The mixed output is supplied through the mixed output cable 26 to the ignition plug 27**.

Second Embodiment

Figure 3:
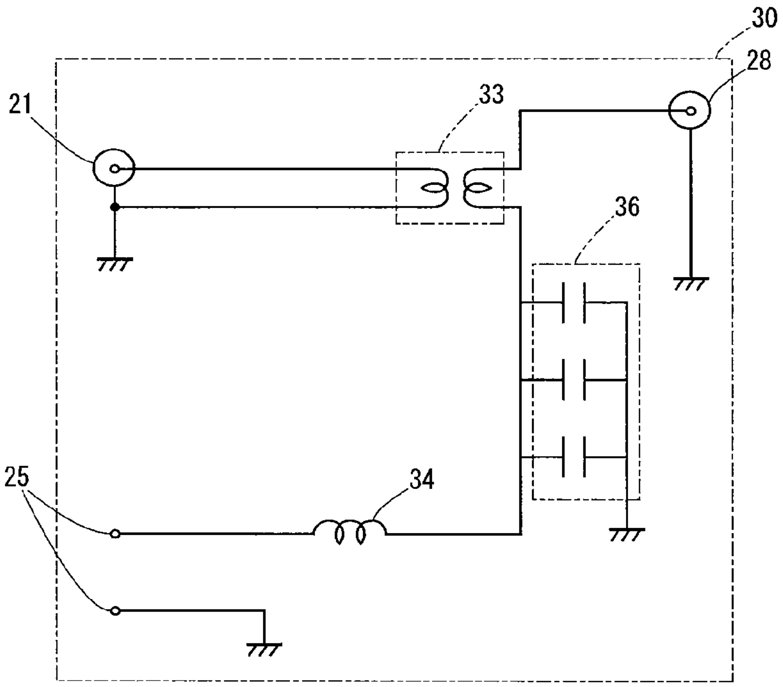
FIG. 3 is a circuit diagram showing a configuration of a mixing circuit in an ignition or plasma generation apparatus according to the second embodiment of the present invention.

FIG. 3 shows a circuit configuration of a mixing circuit 30 according to a second embodiment that can be used as a replacement for the mixing circuit 13 in the ignition or plasma generation apparatus according to the first embodiment. In the mixing circuit 30, a second input terminal 21 is connected to a primary winding of a high-frequency transformer 33 as shown in FIG. 3. One end of a secondary winding of the high-frequency transformer 33 is connected to a first input terminal 25 via a coil 34 that has a similar property to the coil 24 in the first embodiment. The connection between the one end of the secondary winding of the high-frequency transformer 33 and the coil 34 is configured so that a stray capacitance 36 is present in relation to earth. This section is therefore in a state equivalent to being earthed. As a result, the microwave energy inputted through the second input terminal 21 is transmitted to the output terminal 28 without flowing to the first input terminal 25.

Third Embodiment

Figure 4:
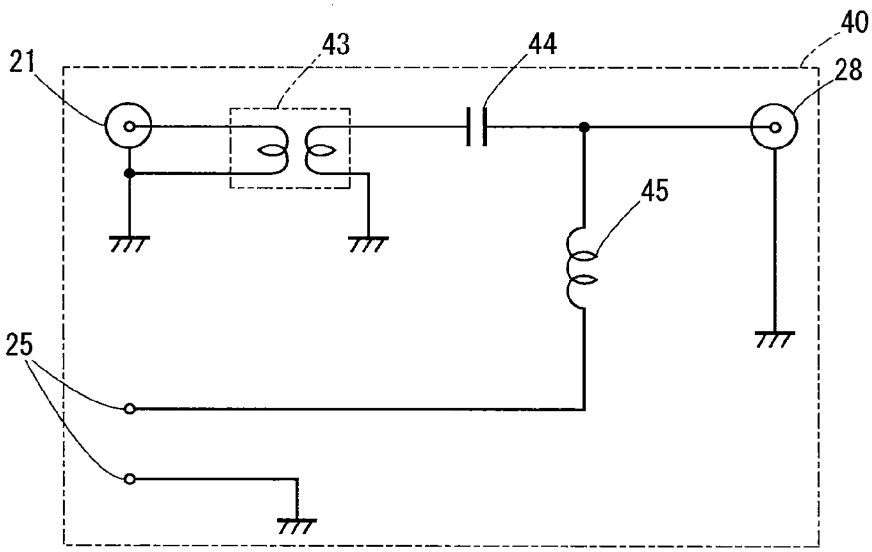
FIG. 4 is a circuit diagram showing a configuration of a mixing circuit in an ignition or plasma generation apparatus according to the third embodiment of the present invention.

FIG. 4 shows a circuit configuration of a mixing circuit 40 according to a third embodiment that can be used as a replacement for the mixing circuit 13 in the ignition or plasma generation apparatus according to the first embodiment.

In the mixing circuit 40, a second input terminal 21 is electrically coupled to an output terminal 28 by a magnetic field coupling and an electrical field coupling connected in series, as shown in FIG. 4. In the mixing circuit 40, a second input terminal 21 is connected to a primary winding of a high-frequency transformer 43. One end of a secondary winding of the high-frequency transformer 43 is earthed, and the other end is connected to the output terminal 28 via a capacitor 44. The first input terminal 25 is connected to the output terminal 28 via a coil 45 that has a similar property to the coil 24 in the first embodiment.

Fourth Embodiment

Figure 5:
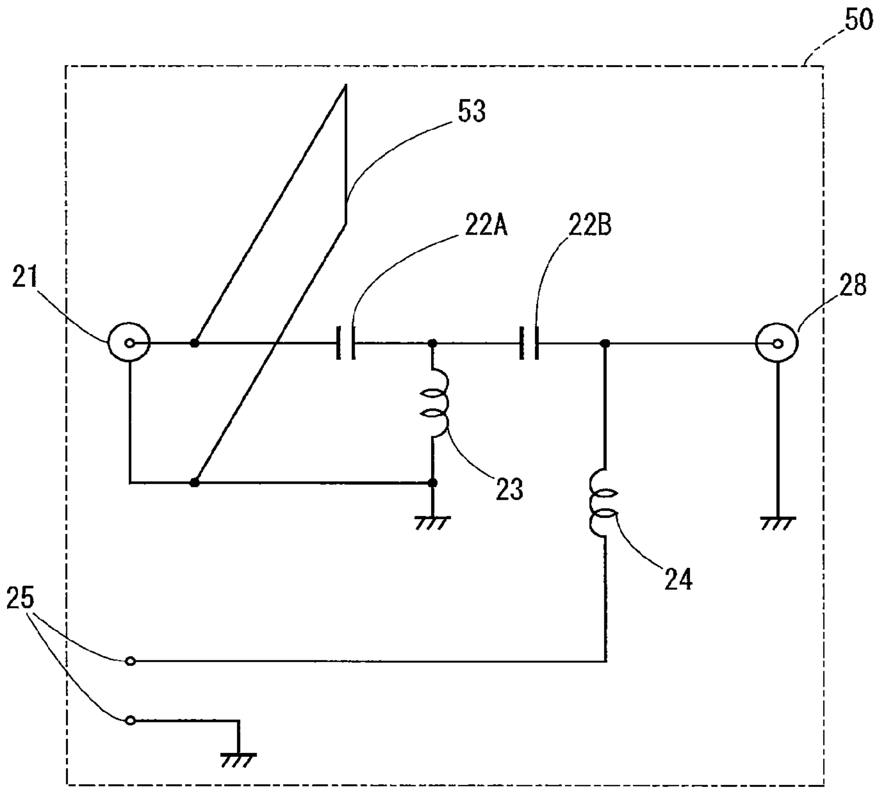
FIG. 5 is a circuit diagram showing a configuration of a mixing circuit in an v according to the fourth embodiment of the present invention.

FIG. 5 shows a circuit configuration of a mixing circuit 50 according to a fourth embodiment that can be used as a replacement for the mixing circuit 13 in the ignition or plasma generation apparatus according to the first embodiment. As shown in FIG. 5, the mixing circuit 50 has a first input terminal 25, a second input terminal 21, a capacitor **22*a*, a capacitor 22*b*, a coil 23, a coil 24, and an output terminal 28**, each of which being identical to that in the mixing circuit according to the first embodiment.

The mixing circuit 50 further has a tuning stub 53 provided between the second input terminal 21 and the capacitor **22*a*. The tuning stub 53 makes it possible to match the characteristic impedance of a transmission line from the microwave generator 12 with the impedance of the second input terminal 21**.

Fifth Embodiment

Figure 6:
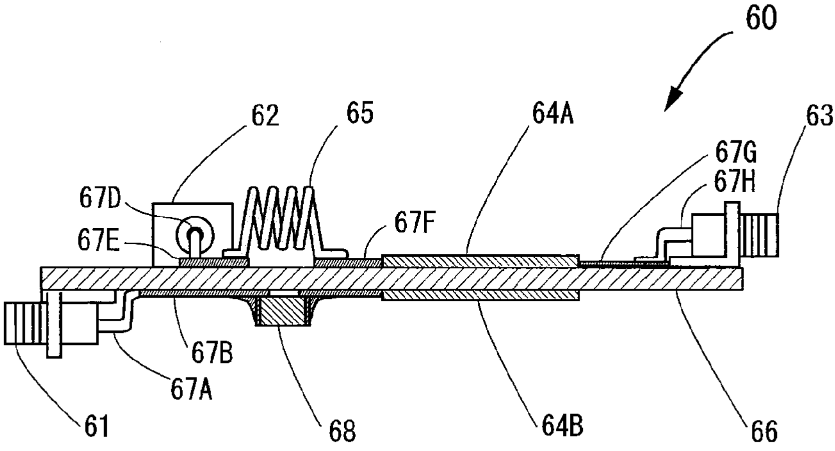
FIG. 6 is a cross-sectional view showing a configuration of a circuit board in an ignition or plasma generation apparatus according to the fifth embodiment of the present invention.

FIG. 6 shows a side view of a circuit board 60 in an ignition apparatus according to a fifth embodiment.

A mixing circuit in an ignition or plasma generation apparatus according to any of the first through fourth embodiments described above can be mounted on a circuit board. As shown in FIG. 6, the circuit board 60 includes the mixing circuit 13 configured on a double-sided substrate 66 ("substrate" hereafter) made of a dielectric material. Conductive patterns 64*a* and 64*b* are formed on the circuit board 60 in opposing positions across the substrate 66. The conductive patterns 64*a* and 64*b* form a capacitor with the substrate 66 constituting a dielectric thereof.

Microwave energy inputted into a microwave input terminal 61 is transmitted to the conductive pattern 64*b* via transmission paths 67*a* and 67*b* and a chip 68 for adjusting properties. From the conductive pattern 64*b*, the microwave energy is transmitted to the conductive pattern 64*a*. The microwave energy is then transmitted to a mixed output terminal 63 via transmission paths 67*g* and 67*h*.

Meanwhile, a high-voltage pulse inputted into a high-voltage pulse input terminal 62 is transmitted to a transmission path 67*f* via transmission paths 67*d* and 67*e* and a coil 65. The high-voltage pulse travels through the conductive pattern 64*a* and is transmitted to the mixed output terminal 63 via the transmission paths 67*g* and 67*h*. As a result, the microwave energy and the high-voltage pulse are outputted in a superimposed fashion through the mixed output terminal 63.

Sixth Embodiment

Figure 7:
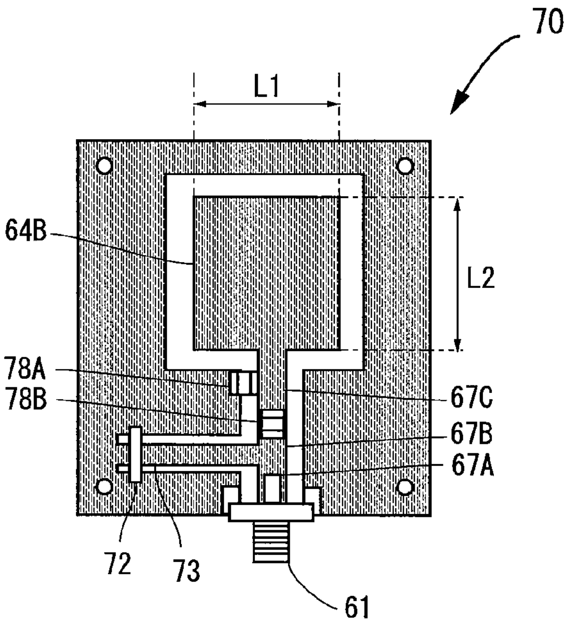
FIG. 7 is a top view showing a pattern and component layout on one surface of a circuit board in an ignition or plasma generation apparatus according to the sixth embodiment of the present invention.
Figure 8:
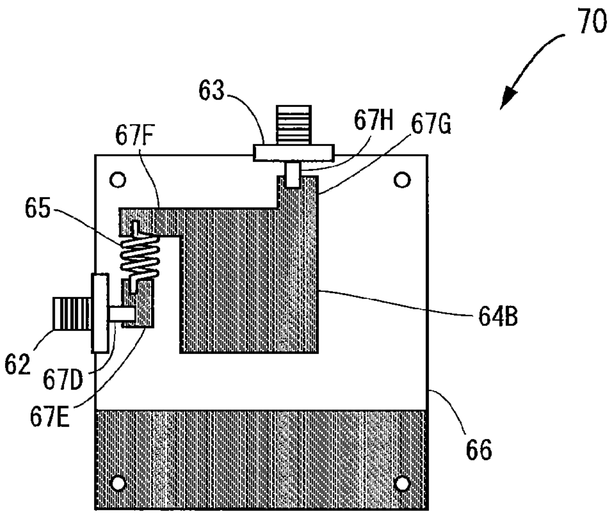
FIG. 8 is a top view showing a pattern and component layout on the other surface of a circuit board in an ignition or plasma generation apparatus according to the sixth embodiment of the present invention.

FIG. 7 shows one surface of a circuit board 70, to which is mounted the mixing circuit 50 according to the fourth embodiment, and FIG. 8 shows the other surface of the circuit board 70.

The microwave input terminal 61 is provided on one surface of the circuit board 70, as shown in FIG. 7. On the circuit board 70, the transmission paths 67*b* and 67*c* are connected via a chip 78*b*. The transmission path 67*c* is connected to an earthed region via a chip 78*a*. The chips 78*b* and 78*a* are used for finely adjusting the property of the circuit board 70. The circuit board 70 further has an impedance adjustment stub 73 comprising a substrate pattern linked to the transmission path 67*b*, and a short-circuiting element 72 inserted into the impedance adjustment stub 73. The impedance adjustment stub 73 functions as a stub for adjusting impedance according to the position at which the short-circuiting element 72 is inserted. In general, assuming the characteristic impedance of a transmission path to be Z0, the impedance Z at the input end when a terminal end is short-circuited is represented as follows:

$Z = jZ0 \tan \beta L$ (where β is a phase constant, and L is the length between the input end and the short-circuit point)

More specifically, by adjusting the length L between the input end and the short-circuit point, with λ/2 being the maximum length, impedance equivalently introduced in parallel can be varied, and the input impedance of the mixing circuit can be adjusted.

On the other surface of the circuit board 70, the high-voltage pulse input terminal 62, a coil 65, the conductive pattern 64*b* positioned opposite the conductive pattern 64*a*, a mixed output terminal 63, and the transmission paths 67*d*, 67*e*, 67*f*, 67*g*, and 67*h* connecting the components are provided as shown in FIG. 8.

In the circuit board 70, each of the respective widths L1 and L2 of the conductive patterns 64*a* and 64*b* is λ/4 or less. The electrical field distribution in the dielectric interposed between the electrodes of the capacitor is thereby made uniform. The capacitance C is represented as follows, taking S as the electrode pattern area, d as the substrate thickness, and ∈ as the dielectric constant.

$$C = \in S/d$$

For example, when a substrate made of glass-reinforced polyphenylene ether (PPE) with a thickness of 1 mm and a relative dielectric constant of 3.5 is used, an area of 3.2 $cm^2$ is necessary to obtain a capacitance of 10 PF; in an instance where the electrodes have a square (rectangular) shape, a side length of √3.2 cm (approximately 1.8 cm) is required. A microwave with a frequency of 2.4 gigahertz (GHz) has a wavelength of 12.5 cm, and satisfies the condition of the side length being λ/4 or less.

In the circuit board 70, the conductive patterns 64*a* and 64*b* forming the capacitors may be circular instead of rectangular.

Seventh Embodiment

Figure 9:
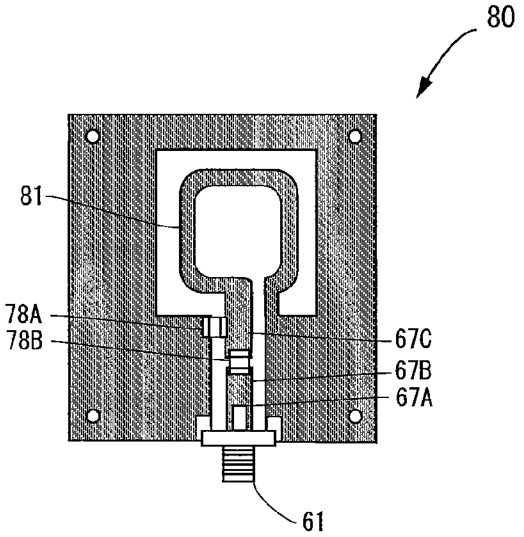
FIG. 9 is a top view showing a pattern and component layout on one surface of a circuit board in an ignition or plasma generation apparatus according to the seventh embodiment of the present invention.
Figure 10:
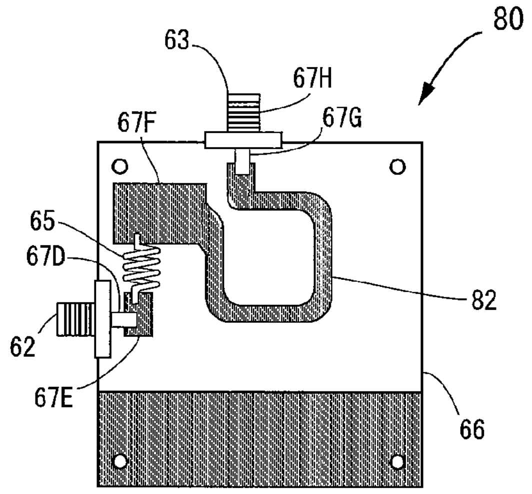
FIG. 10 is a top view showing a pattern and component layout on the other surface of a circuit board in an ignition or plasma generation apparatus according to the seventh embodiment of the present invention.

FIG. 9 shows one surface of a circuit board 80, to which is mounted the mixing circuit 30 according to the second embodiment, and FIG. 10 shows the other surface of the circuit board 80.

In the circuit board 80, a primary-side coil conductive pattern 81 and a secondary-side coil conductive pattern 82 of the high-frequency transformer are disposed in opposing positions on both surfaces of the substrate 66 as shown in FIGS. 9 and 10, and respectively constitute a primary and secondary coil forming the high-frequency transformer. Microwaves inputted into the microwave input terminal 61 generate an inductive magnetic field when flowing through the primary-side coil conductive pattern 81 of the high-frequency transformer, thereby inducing microwaves in the secondary-side coil conductive pattern 82 of the high-frequency transformer oppositely positioned across the substrate 66. With regard to the microwaves induced in the secondary-side coil conductive pattern 82 of the high-frequency transformer, an end portion 67*f* of the secondary-side coil conductive pattern 82 towards the coil 65 is in a state equivalent to being earthed via a stray capacitance created on a pattern on the other surface; therefore, the induced microwaves are outputted to earth and the mixed output terminal 63.

Eighth Embodiment

Figure 11:
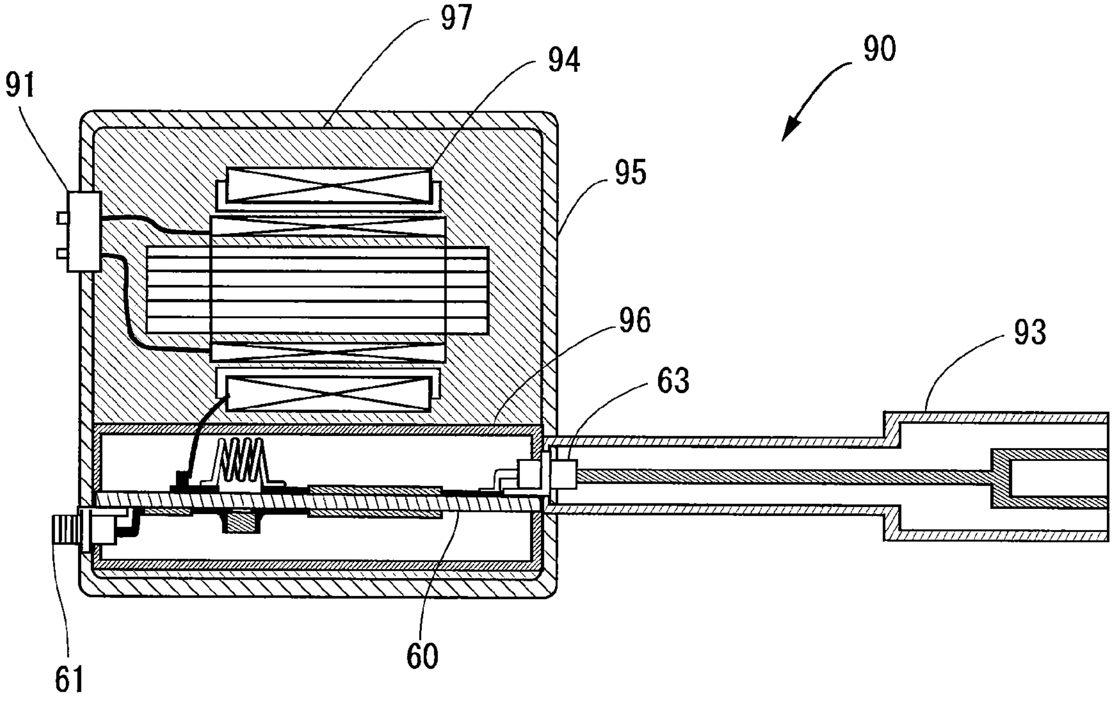
FIG. 11 is a cross-sectional view showing a configuration in which a circuit board and an ignition coil are integrally provided as a module in an ignition or plasma generation apparatus according to the eighth embodiment of the present invention.

FIG. 11 shows a configuration of a module 90 of an ignition apparatus according to an eighth embodiment, in which an ignition coil and the circuit board 60 are integrally provided.

A circuit board according to the fifth through the seventh embodiments can be integrated as an ignition coil to constitute a module 90, as shown in FIG. 11. In the module 90, the circuit board 60 constituting the mixing circuit is shielded by a metal case 96 so as to prevent leakage of microwaves and accommodated in a housing 95, with the microwave input terminal 61 and the mixed output terminal 63 in an externally exposed state. An ignition coil 94 is accommodated with the metal case 96 in the housing 95. A primary side of the ignition coil 94 is connected to a terminal 91, and a secondary side is connected to the circuit board 60. An interior of the housing 95 is filled with a molded plastic material.

The metal case 96 has a sealed structure into which the molded plastic material does not penetrate, and is hollow. The high-frequency characteristics of the mixing circuit section are thereby not affected by the molded plastic material.

The mixed output terminal 63 is connected to a coaxially-structured mixed output cable 93. A center conductor of the mixed output cable 93 is connected to a center electrode of an ignition plug (not shown). An external conductor of the mixed output cable 93 is connected so as to envelope a main metal fitting of the ignition plug. Microwaves are thus prevented from leaking from the mixed output cable 93.

Also, providing an isolator on a transmission path comprising the mixed output cable 93 makes it possible to prevent or reduce a reverse flow of microwaves, and enhances safety.

Using a module 90 of such description makes it possible to introduce both the microwave energy and the high-voltage pulse into the combustion chamber and to ignite an air-fuel mixture gas in the combustion chamber using a regular ignition plug without modifying a main body of an internal combustion engine.

Although in the eighth embodiment, the mixing board is provided integrally with the ignition coil, the mixing board may be provided integrally with an ignition plug. Further integrating the mixing board and the ignition plug with an antenna to form a modular structure makes it possible to introduce both the microwave energy and the high-voltage pulse into the combustion chamber and to ignite an air-fuel mixture gas in the combustion chamber using a regular ignition coil without modifying a main body of an internal combustion engine.

Ninth Embodiment

In each of the embodiments described above, a regular spark plug is used as a plug for an ignition or plasma equipment. However, the plug may be one that has a structure particularly suitable for transmission of electromagnetic waves. A plug according to an embodiment of such description will now be described as an example.

Figure 12:
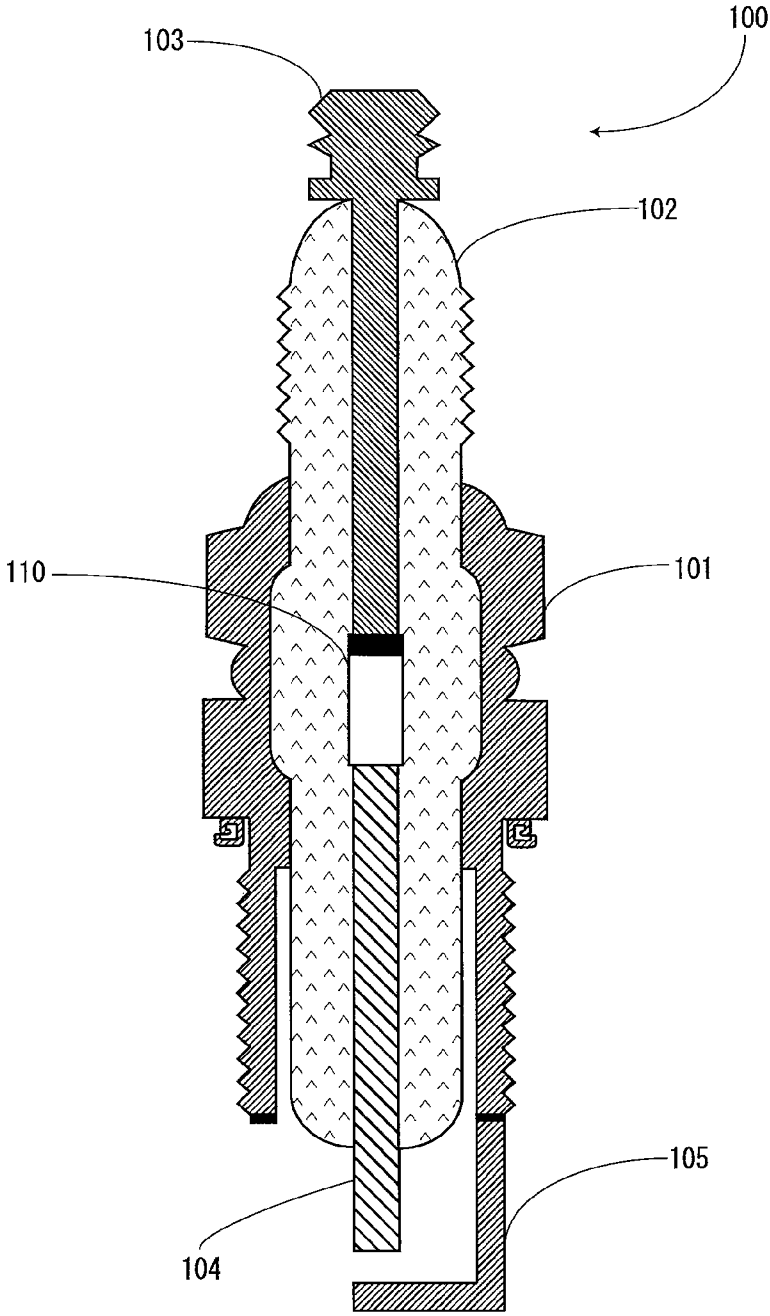
FIG. 12 is a cross-sectional view of a plug suitable for use in an ignition or plasma generation apparatus according to any of the first through eighth embodiments.

FIG. 12 is a cross-section view of a plug 100 that is suitable as a plug for an ignition or plasma generation apparatus according to any of the first through the eighth embodiments. As with a regular spark plug, the plug 100 shown in FIG. 12 includes a main metal fitting 101 made of a conductive body and a cylindrical insulator 102 that penetrates the main metal fitting 101. A first center conductor 103 and a second center conductor 104, both rod-shaped, are inserted into mutually opposing end portions of the cylindrical insulator 102 and accommodated therein so as to be spaced apart from each other. One end portion of the first center conductor 103 protrudes from the cylindrical insulator 102, and constitutes a connecting section that connects with the mixing circuit. One end portion of the second center conductor 104 protrudes from the cylindrical insulator 102 at an end located opposite to the connecting section, and functions both as a cathode for electrical discharge and an antenna for radiating electromagnetic waves. A protrusion 105 is provided towards the cathode-antenna end of the main metal fitting 101 so as to face the cathode-antenna end of the main metal fitting 101, and functions as an anode for the electrical discharge.

In what is known as a resistor plug, the first center conductor 103 and the second center conductor 104 are connected via a resistor. In the plug 100, the first center conductor 103 and the second center conductor 104 are connected by a CR composite device 110 instead of the electrical resistor.

Figure 13:
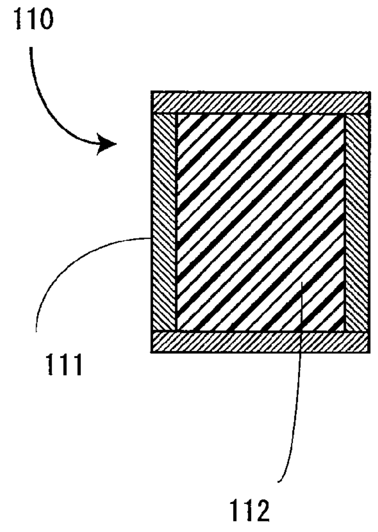
FIG. 13 is a cross-sectional view of a CR composite device.
Figure 14:
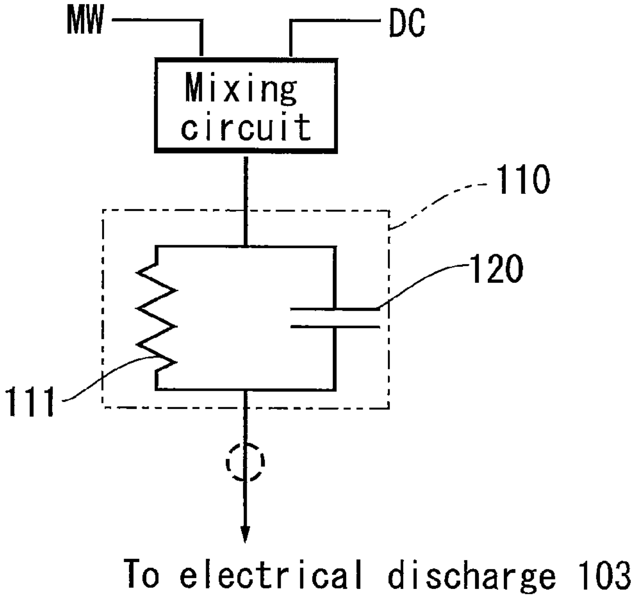
FIG. 14 is an equivalent circuit diagram of a CR composite device.

FIG. 13 is a cross-section view of the CR composite device 110, and FIG. 14 is an equivalent circuit diagram for the CR composite device 110. With reference to FIG. 13, the CR composite device 110 includes a cylindrical resistance layer 111 provided between the first center conductor 103 and the second center conductor 104 along an inner wall of the cylindrical insulator 102, and a dielectric layer 112 formed in a space enclosed by the first center conductor 103, the second center conductor 104, and the resistance layer 111. The first center conductor 103, the second center conductor 104, and the dielectric layer 112 form a capacitor. In electrical terms, the resistance layer 111 is electrically connected in parallel to a capacitor 120 as shown in FIG. 14.

The resistance layer 111 is made of a regular resistant body. A carbon fiber film, electrically conductive glass fiber film, or a similar material is suitable in terms of ease of shaping, but the resistance layer 111 is not limited to such materials. The dielectric layer 112 is made of a regular dielectric body, and any suitable material may be used therefor. The section with the dielectric layer 112 may also be a vacuum. It is nevertheless preferable for the dielectric layer to have a sufficient insulating capacity with regards to the high pulse voltage applied to the plug 100.

With reference to FIG. 14, when a high DC pulse voltage is applied to the first center conductor 103, the high pulse voltage is transmitted to the second center conductor 104 via the resistance layer 111 without being transmitted through the capacitor 120. DC noise from the second center conductor 104 reverses so as to flow to the first center conductor, also through the resistance layer 111. As a result, the CR composite device 110 has an effect of reducing noise similar to that of a resistor in a regular resistor plug when a DC pulse voltage is applied The presence of the capacitor 120 results in an electrical coupling (capacitive coupling) between the first center conductor 103 and the second center conductor. Therefore, when electromagnetic waves are applied to a coaxial line comprising the first center conductor 103 and the main metal fitting 101, they will not only be transmitted to the second center conductor 104 via the resistance layer 111 but also through the capacitor 120 to the second center conductor. The electromagnetic waves can be transmitted with a greater transmission efficiency than a regular resistor plug by the amount transmitted through the capacitor.

As described above, using the plug according to the present embodiment makes it possible to obtain sufficient electromagnetic wave transmission efficiency while maintaining an effect of reducing DC high pulse voltage reflection noise similar to that of a regular resistor plug.

The resistance layer may be one that entirely encloses the dielectric layer, or one that partially encloses the dielectric layer. The resistance layer is not necessarily required to be in contact with the dielectric layer.

Tenth Embodiment

Figure 15:
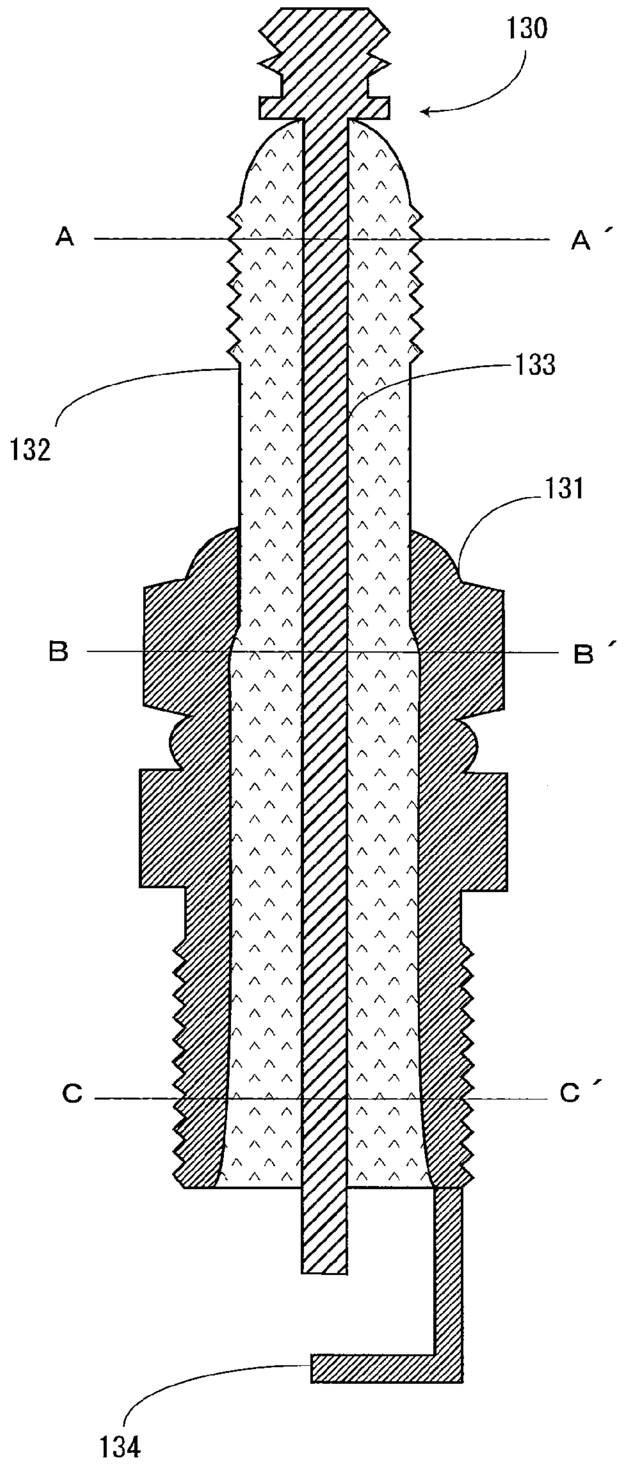
FIG. 15 is a cross-sectional view of another plug suitable for use in an ignition or plasma generation apparatus according to any of the first through eighth embodiments.

FIG. 15 is a cross-section view of another plug 130 suitable as a plug for the ignition or plasma generation apparatus according to any of the first through the eighth embodiments. As with a regular spark plug, the plug 130 includes a main metal fitting 131 made of a conductive body and a cylindrical insulator 132 that penetrates the main metal fitting 131. A substantially rod-shaped center conductor 133 is accommodated within the insulator 132. Both ends of the center conductor 133 protrude from the insulator 132. One end section forms a connecting section that connects with the mixing circuit, and the other end section functions both as a discharge electrode and an antenna. A protruding section 134 is provided on the main metal fitting 131 towards the discharge electrode-antenna end; the protruding section 134 constitutes an earthing electrode.

Figure 16:
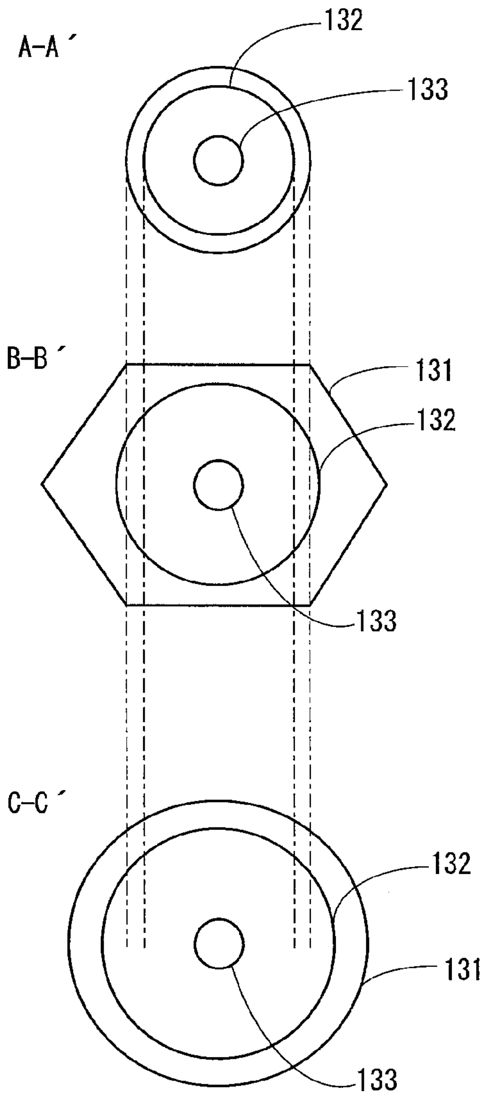
FIG. 16 is a transverse cross-sectional view across sections A-A', B-B', C-C' of the plug.

FIG. 16 shows transverse cross-sections A-A', B-B', C-C' of the plug 130. The transverse cross-sections of the plug 130 are shaped so that the diameter of an inner surface of the main metal fitting 131 relative to the diameter of the center conductor 133 increases from the connecting section that connects with the mixing circuit to the electrode-antenna end. Such a shape causes the impedance in the direction from the connecting section to the electrode-antenna end to decrease with increasing proximity to the electrode end. The impedance between the mixing circuit end and the discharge electrode end is thereby matched, reducing transmission loss.

The method for adjusting the impedance is not limited to use of the ratio between the diameter of the inner surface of the main metal fitting 131 and the diameter of the center conductor 133; the impedance may be adjusted using the material used in the insulator 132. Specifically, the material used in the insulator 132 may be selected so that the dielectric constant increases with increasing proximity to the discharge electrode end.

Eleventh Embodiment

In each of the above-mentioned embodiments, a distal end of the plug has a similar form to that of a regular spark plug. Configuring the plug so that a plasma is ejected in a predetermined direction increases the usefulness of the ignition or plasma generation apparatus according to each of the embodiments when used as a plasma source.

Figure 17:
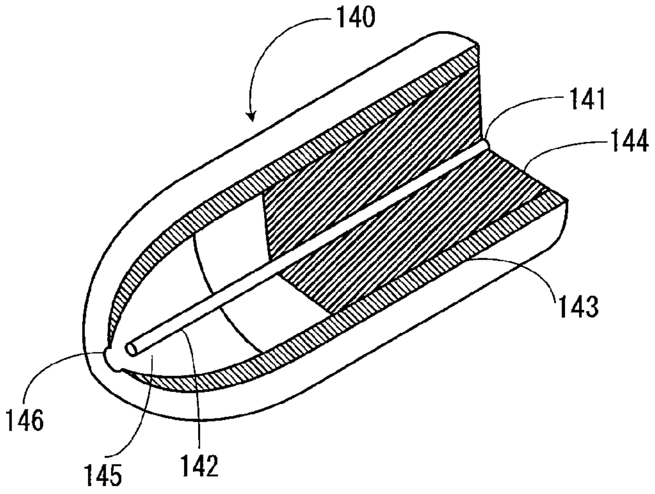
FIG. 17 is a schematic view of a distal end section of a plug having a structure whereby a plasma is ejected in a predetermined direction.

FIG. 17 is a schematic view of a distal end section of a plug having a structure whereby a plasma is ejected in a predetermined direction. In a plug 140 shown in FIG. 17, a center conductor 141 is connected to a center line of an output section of a mixing circuit. An antenna-center electrode section 142 is connected to, or formed in an integrated manner at, a distal end portion of the center conductor 141 (i.e., at an opposite end to a connecting section that connects with the mixing circuit). The plug 140 also has an outer conductor 143 that encloses the center conductor 141 and the antenna-center electrode section 142 up to a distal end of the antenna-center electrode section 142. A space between the center conductor 141 and the outer conductor 143 is filled with a dielectric member 144.

The dielectric member 144 may, like an insulator, be made of a ceramic material, or alternatively may be made of glass or a plastic material such as a resin. With regards to the plug 140, a section between the connecting section that connects with the mixing circuit and the center conductor 141 as well as the antenna-center electrode section 142 may have a similar structure to that of a regular spark plug, or a similar structure to the plug according to the ninth or the tenth embodiments described above.

The dielectric member 144 is not loaded into a region surrounding the antenna-center electrode section 142. A void 145 having a predetermined volume is defined by the antenna-center electrode section 142, the outer conductor 143, and the dielectric member 144. An opening 146 is provided on the outer conductor 143 in a vicinity of the antenna-center electrode section 142. The opening 146 links the void 145 with the exterior.

The insulation distance between the antenna-center electrode 142 and the outer conductor 143 is preferably at a minimum in a vicinity of the opening 146. When a configuration of such description is used, an electrical discharge is produced and a plasma is generated in the vicinity of the opening 146, electromagnetic waves simultaneously generate a strong electrical field in the region, and the plasma expands.

When the plug 140 receives energy from the mixing circuit, a plasma is generated in the space 145 in the vicinity of the opening 146. The generated plasma heats gas inside the space 145, increasing the pressure in the space 145. A pressure difference is thereby created between the void 145 and the exterior. The resulting pressure difference pushes the plasma generated in the vicinity of the opening 146 to the exterior. As a result, the plasma is ejected from the opening 146.

Since the plug 140 according to the present invention has a structure whereby a pressure difference is used to eject the plasma, the volume of the void 145 is selected so that the pressure difference obtained by the plasma heating the interior of the void 145 and increasing the pressure therein is sufficiently large for the plasma to be ejected. The pressure difference that is sufficiently large for the plasma to be ejected is determined by the viscosity and other physical properties of the generated plasma and the amount of energy applied to the plug 140 for increasing the temperature. The appropriate volume is therefore selected according to the amount of energy applied and plasma source gas.

Figure 18:
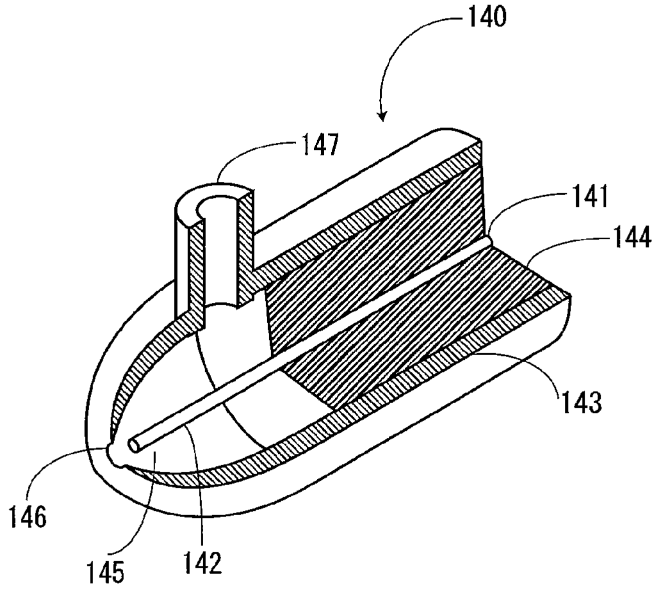
FIG. 18 is a schematic view of a distal end section of another plug having a structure whereby a plasma is ejected in a predetermined direction.

A gas inlet channel 147 for introducing gas into the void 145 may also be provided, as shown in FIG. 18. The plasma source gas can be selected by selecting a gas to introduce through the gas inlet channel 147. Introduction of the gas also makes it possible to increase the internal pressure in the void 145, aiding the plasma ejection.

Twelfth Embodiment

Figure 19:
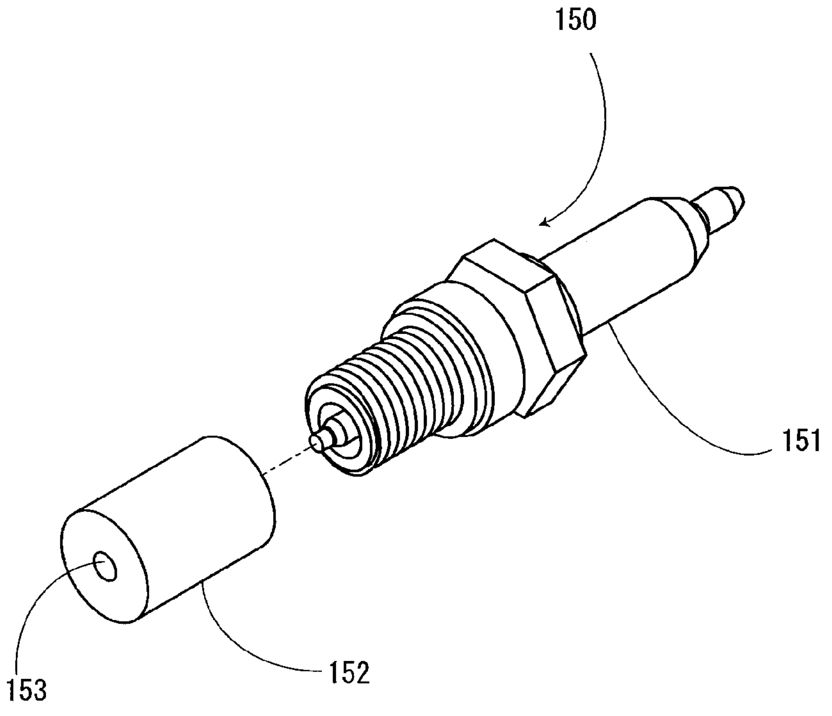
FIG. 19 is a schematic drawing showing a configuration of an analysis apparatus according to the present embodiment.
Figure 2:
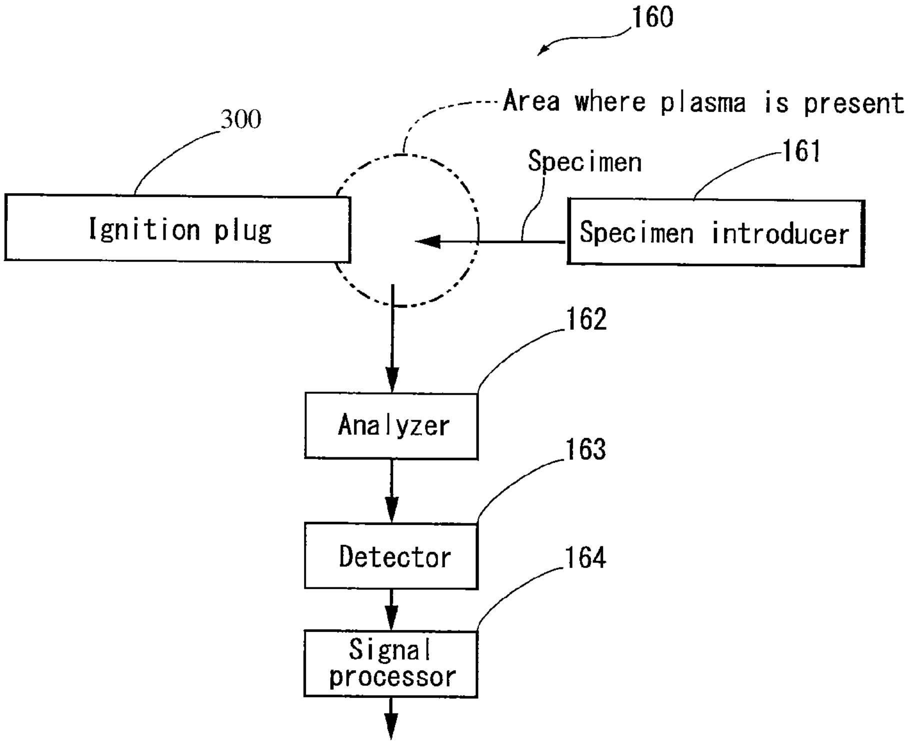

FIG. 19 is a schematic view showing a distal end section of another plug having a structure whereby a plasma is ejected in a predetermined direction. The plug 150 shown in FIG. 19 includes a main plug body 151 that has a similar internal structure to that of a regular spark plug, the plug according to the ninth embodiment, or the plug according to the tenth embodiment, and in which an earthing electrode is removed; and a cap 152 that is threadedly engaged to a plugging portion of the main plug body 151 so as to enclose a distal end of the main plug body 151.

The cap 152 is shaped as a cylinder in which an end opposite the threadedly engaging portion is narrowed. An opening 153 provided to the narrowed end links the interior space in the cap to the exterior. The insulation distance of the cap 152 is at a minimum in the vicinity of the opening 153 and the center electrode of the main plug body 151. The volume of a void surrounded by the main plug body 151 and the cap 152 may be determined in a similar manner to the volume of the void 145 according to the eleventh embodiment. A gas inlet channel for introducing gas into the void within the cap 152 may also be provided.

According to the present embodiment, a plasma can be ejected using a conventional spark plug, the plug according to the ninth embodiment, or the plug according to the tenth embodiment. Further, selecting a structure in which the main plug body 151 and the cap 152 threadedly engage facilitates the process of adjusting the volume of a void in which the plasma is generated.

Thirteenth Embodiment

The ignition or plasma generation apparatus according to the eleventh or the twelfth embodiment makes it possible to eject a plasma using a plug that is both compact and has a simple structure. The plasma may be used to ignite an internal combustion engine or a similar device, or used as a plasma source for composition analysis. As an example of application as a plasma source, the present embodiment shows an analysis apparatus using plasma.

FIG. 20 is a schematic drawing showing a configuration of an analysis apparatus according to the present embodiment. The analysis apparatus 160 shown in FIG. 20 includes an ignition or plasma generation apparatus 300 according to the twelfth embodiment, a test sample introduction device 161 for introducing or placing a test sample into a region that contains plasma to be ejected from the ignition or plasma generation apparatus 300, an analysis device 162 for analyzing results of exposing the test sample to the plasma ejected from ignition or plasma generation apparatus 300, a detection device 163 for converting results of the analysis performed by the analysis device 162 into a signal in a predetermined format, and a signal processor 164 for processing results of the signal generated by the detection device 163 and displaying the results of the detection and the analysis to the user.

The test sample introduction device 161 is one that is capable of placing the test sample so as to be exposed to the plasma ejected from ignition or plasma generation apparatus 300. For example, in an instance where the test sample is a solid, the test sample introduction device 161 may be a supporting tool capable of positioning the test sample relative to the ignition or plasma generation apparatus. In an instance where the test sample is a fluid, the test sample introduction device 161 may be a fluid flow channel, a fluid container, or a fluid ejection device. Also, in an instance where the test sample is a fluid, a chromatography column or a similar device may be provided upstream of the test sample introduction device 161.

The analysis device 162 may be appropriately selected according to the type of test sample expected to be used. For example, it is possible to use a device that separates an excited test sample using an electrical or magnetic field and analyzes the test sample, such as a magnetic deflection type, a quadrupole type, an ion-trap type, a time-of-flight type, a Fourier-transform ion cyclotron resonance type, or a tandem type analyzer. Alternatively, an optical analyzer comprising a photoreceiver, a spectrometer, and an optical system for providing an optical path between the photoreceiver and the spectrometer may be used.

For the detection device 163, one that is compatible with the analysis method used by the analysis device 162 may be selected as appropriate. For example, a device that uses a photomultiplier tube, a microchannel plate detector, or a similar device to increase the quantity of, and detect, electrons transported from the excited test sample may be used. A device that uses a Faraday cup or a similar device to perform measurements on the excited test sample may also be used. A detection device comprising a cloud chamber and an imaging device may also be used. In an instance where an optical analyzer is used as the analysis device 162, the detection device may be an optical sensor or an image sensor that uses a photomultiplier, a complementary metal-oxide semiconductor device, a charge-coupled device, or a similar device.

The signal processor 164 is, more specifically, a computer (i.e., computer hardware, a program that operates using the computer hardware, and data provided to the computer). The signal may be processed and the results displayed to the user each using a regular, widely known method selected according to the type, format, and similar attributes of the analysis device 162 and the detection device 163 used in the analysis. The operation of the computer is widely known and will not be described herein.

The analysis device may be configured to operate as an ignition device for an internal combustion engine. In such an instance, the results of the signal processed by the signal processor 164 may be fed to a control device in the internal combustion engine and used by the control device to control the internal combustion engine.

<Other Variations>

In the embodiments described above, rectangular or circular electrode plates are used as examples of the electrode plates in the capacitor used for capacitive coupling; however, the present invention is not limited in scope to such embodiments. An electrode plate of any shape may be used, provided a favorable electrical coupling can be obtained.

Also, as long as the electrical field distribution in the dielectric positioned between the capacitor electrodes is not required to be uniform, the width of the conductive patterns forming the capacitor may exceed one quarter of the wavelength of the electromagnetic waves.

In the embodiments described above, a spark plug and a plug having a coaxial transmission path are used as examples of a plug; however, the plug according to the present invention is not limited to plugs of such description. A coaxial structure is not a necessary requirement, as long as the structure makes it possible to favorably transmit and radiate electromagnetic waves. For example, a plug having transmission lines in parallel may also be used. Alternatively, a glow plug with a discharge electrode may also be used. One of the pair of conductors constituting the discharge electrode may be a glow plug filament, or a conductor connected to a glow plug filament.

Also, the plug is not necessarily required to have an earthing electrode within. Of the conductors constituting a discharge electrode, the conductor on the earthed side may be provided separate to the plug. For example, in an instance where the plug is attached to a metal object or the plug is attached in an immediate vicinity of a metal object, the metal object may be used as the earthing electrode as long as the metal object is earthed.

In the embodiments described above, a DC (pulse voltage) is used to supply energy for electrical discharge; however, the present invention is not limited in scope in this respect. The energy for electrical discharge may be in AC, and high-frequency AC may be used. In an instance where the energy for discharge is in AC, it is possible to minimize a reverse flow of electromagnetic waves traveling back to the discharge energy transmission line as long as the discharge energy transmission line is configured so that coupling by an electric or magnetic field coupling takes place at a step that is located upstream of a section in which electromagnetic wave energy is superimposed. In such an instance, it is preferable that the frequency of the discharge energy is different from the frequency of the electromagnetic waves.

In the embodiments described above, pulse voltage to be applied to the ignition plug and microwaves are superimposed on each other on the same transmission line; and energy in the form of light, sound, shock waves, friction, or heat may also be supplied on the same transmission line in a superimposed fashion. It becomes possible to use the energies listed for ignition or plasma generation.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. An ignition or plasma generation apparatus for using a combination of an electrical discharge and energy derived from electromagnetic waves to initiate a combustion reaction, a chemical reaction, or a plasma reaction in a reaction region where the combustion reaction, the chemical reaction, or the plasma reaction takes place in a heat engine or a plasma equipment, the ignition or plasma generation apparatus comprising:

a mixer mixing energy for an electrical discharge and energy from electromagnetic waves generated by an electromagnetic wave generator; and a plug into which an output from the mixer is supplied, the plug used for introducing an output to a reaction region;

wherein the output supplied from the mixer to the plug includes the energy from electromagnetic waves and the energy for the electrical discharge superimposed on each other and supplied on a same transmission line, wherein the energy for electrical discharge is a pulse voltage, and the mixer includes:

a first input section for receiving an input of the energy from electromagnetic waves;

a second input section for receiving an input of the pulse voltage; and an output section connected to the second input section; and wherein the first input section is electrically coupled to the output section by a magnetic field coupling and an electrical field coupling, wherein the mixer includes a dielectric substrate, the second input section is disposed on one surface of the dielectric substrate, each of the first input section and the output section is disposed on the other surface of the dielectric substrate, and the electrical field coupling derives from the capacitance of a capacitor comprising a conductive pattern disposed in an opposing manner on respective surfaces of the dielectric substrate.

2. The ignition or plasma generation apparatus according to claim 1, wherein the first input section is electrically coupled to the output section by the magnetic field coupling and the electrical field coupling connected in series.

3. The ignition or plasma generation apparatus according to claim 2, wherein the width of the conductive pattern constituting the capacitor is equal to or less than one quarter of the wavelength of the electromagnetic wave received by the first input section.

4. The ignition or plasma generation apparatus according to claim 1, wherein the first input section includes a stub for matching the impedance of the first input section with the characteristic impedance of a transmission line from the electromagnetic wave generator.

5. The ignition or plasma generation apparatus according to claim 2, wherein the first input section includes a stub for matching the impedance of the first input section with the characteristic impedance of a transmission line from the electromagnetic wave generator.

6. The ignition or plasma generation apparatus according to claim 3, wherein the first input section includes a stub for matching the impedance of the first input section with the characteristic impedance of a transmission line from the electromagnetic wave generator.

* * * * *